United States Patent [19]

Paschke et al.

[11] Patent Number: 5,292,805
[45] Date of Patent: Mar. 8, 1994

[54] FILLED POLYPHTHALAMIDE BLENDS HAVING IMPROVED PROCESSABILITY AND COMPOSITE AND FILLED ARTICLES THEREFROM

[75] Inventors: Edward E. Paschke, Wheaton; Charles L. Myers, Palatine; Glenn P. Desio, Naperville, all of Ill.

[73] Assignee: Amoco Corporation, Chicago, Ill.

[21] Appl. No.: 889,814

[22] Filed: May 29, 1992

[51] Int. Cl.$^5$ .............................................. C08L 77/10
[52] U.S. Cl. ..................... 525/66; 525/184; 525/179; 525/183; 524/451; 524/494
[58] Field of Search .................. 525/66, 183, 179, 184; 524/451, 494

[56] References Cited

U.S. PATENT DOCUMENTS

| | | | |
|---|---|---|---|
| 4,383,084 | 5/1983 | Paschket et al. | 525/184 |
| 4,404,312 | 9/1983 | Kokubu | 524/504 |
| 4,613,647 | 9/1986 | Yonaiyama et al. | 524/514 |
| 4,673,728 | 6/1987 | Nielinger | 528/339 |
| 4,831,108 | 5/1989 | Richardson | 528/335 |
| 4,988,764 | 1/1991 | Nishio et al. | 525/66 |
| 4,990,550 | 2/1991 | Iwanami et al. | 523/214 |
| 5,006,601 | 4/1991 | Lutz | 525/66 |

FOREIGN PATENT DOCUMENTS 072270 12/1981 Japan .
1076540 4/1986 Japan .
000160 7/1987 Japan .
001502 9/1991 Japan .

OTHER PUBLICATIONS

Encyclopedia of Polymer Science and Engineering, J. Wiley & Sons, New York, 1988, vol. 11, pp. 348-349, 372-373.
Solvay Technical Bulletin "Polyacrylamide and Grafted Polypropylene Alloys Properties and Applications"; English language translation from original French Documents. This bulletin is believed to have been published or presented in Spring of 1990, in Paris.

Primary Examiner—James J. Seidleck
Assistant Examiner—I. Zemel
Attorney, Agent, or Firm—Richard J. Schlott; Stephen L. Hensley

[57] ABSTRACT

Neat and filled polyphthalamide resins are improved in processability when blended with polypropylene and a carboxylated polyolefin resin. Filled polyphthalamides, particularly glass-filled polyphthalamide formulations, are significantly benefited, and glass fiber-filled molding resin formulations of this invention comprising high levels of fiber are more readily moldable than polyphthalamide formulations without the polyolefin components comprising the same and even lower levels of glass-fiber.

9 Claims, No Drawings

FILLED POLYPHTHALAMIDE BLENDS HAVING IMPROVED PROCESSABILITY AND COMPOSITE AND FILLED ARTICLES THEREFROM

BACKGROUND OF THE INVENTION

This invention relates to filled polyphthalamide resin compositions, more particularly to improved filled compositions comprising a filled polyphthalamide, preferably a filled crystallizable or crystalline polyphthalamide, and still more particularly to filled blends comprising filler, polyphthalamide and polypropylene having improved tensile properties and rigidity together with excellent thermal processability, and to a method for providing thermally processable filled polyphthalamide compositions and composites.

The highly desirable balance of strength, stiffness and thermal properties of polyamides has gained these resins wide acceptance in the molding arts and in the extrusion arts including fiber spinning and film extrusion. The resins are found in a great variety of applications, and may be particularly attractive for use where resistance to chemical and thermal attack is required. Further, though the flexibility of these resins makes them highly desirable for many uses, where a greater rigidity is desired the resin will be compounded with reinforcement, for example with glass fiber or the like, to provide the needed increase in rigidity.

Crystalline polyamides comprising at least about 50 mole % aliphatic terephthalamide units exhibit particularly good thermal, strength and stiffness properties, and low water absorption relative to nylon 6,6. Crystalline and crystallizable polyphthalamide resins are known in the art, and a variety of grades are readily available from commercial sources, including for example the Amodel ® Polyphthalamides from Amoco Performance Products, Inc. Such resins have relatively high melting points, generally about 290° C. or higher, and the temperature of onset of thermal degradation for many does not greatly exceed their melting points, making the thermal processing of these resins a more rigorous and complex task, particularly for filled and reinforced polyphthalamides, than is encountered for lower melting polyamides including nylon 6,6, melting at about 260°–265° C. Methods for improving the processability of these high-temperature polyphthalamide resins are clearly needed by the art.

Considerable effort has been made over the years to develop methods for improving the mechanical properties of high-temperature polyamides. For example, polyamides are deficient in impact, particularly when dry, and blends with polyolefins have been developed in efforts to improve impact. However, unmodified polyamides and polyolefins are generally incompatible, and the incompatibility may cause the blends to be generally poor in important mechanical properties, and even cause partial or complete loss of integrity for articles molded or extruded from such blends. The incompatibility of polyolefins with polyamides has been overcome in the art by modifying the polyolefin component to obtain stable dispersions of polyamide and polypropylene. See U.S. Pat. No. 4,988,764. However, the addition of low modulus resins such as polyolefins tends to lower the overall rigidity and reduce performance at elevated temperatures.

The addition of fillers to polyamides, particularly reinforcing fillers such as glass fiber, has long been used to increase rigidity, and glass fiber-reinforced polyamide resins are particularly well known and widely sold for uses requiring enhanced rigidity and improved dimensional stability, particularly at elevated temperatures. The addition of glass fiber or other filler to polyamides generally provides little improvement in other mechanical properties where adhesion to the filler surface is poor.

Blends comprising polyamides and polyolefins may also be subject to reduced performance because of poor adhesion between the resin and filler. Modification of the polyolefin component with unsaturated carboxylic acid compounds and treatment of the fiber with coupling agents to provide a chemical interaction between the modified polypropylene and the fiber surfaces are among the methods that have been employed for overcoming these deficiencies, though with varying degrees of success. Such modifications frequently reduce the attractiveness and visual appearance of the surfaces of molded articles, making further efforts necessary to overcome these added problems. For example, in U.S. Pat. No. 4,613,647 there is described a method for improving the compatibility of glass reinforced, carboxyl-modified polypropylene by the addition of polyamides such as nylon 6 or nylon 6,6. The inherent reactivity of the polyamide with the carboxyl-modified polypropylene is said to cause yellowing and delustering in molded products. The patent further discloses overcoming these added problems through the use of meta-xylylene adipamides as the polyamide component of such compositions; even with these modifications, the resulting glass-reinforced blends remain somewhat deficient in rigidity and tensile properties. The addition of further additives including dyes and pigments tends to further reduce impact properties. In U.S. Pat. No. 4,657,952, there is described an improved method for combining polyamide, olefinic rubber impact modifiers and glass fiber reinforcement to provide reinforced formulations having dyes and pigments while retaining good impact properties.

A great variety of modifiers and additives that may be found useful for overcoming one or more deficiencies have resulted from these efforts, though improvement in a single resin property is quite often accomplished only at some sacrifice in the overall balance of properties. For example, although a variety of carboxylated polyolefins are known for use in combination with glass fiber-filled polyamides, in most instances such additives effect a lowering of rigidity and increase the susceptibility to thermal oxidation. Blends comprising polyamides with crystalline polyolefins or a derivative thereof are known. In U.S. Pat. No. 4,383,084 there are disclosed blends of amorphous polyamides comprising aliphatic terephthalamide and isophthalamide units with up to 10 wt % crystalline polyolefin such as high- or low-density polyethylene or polypropylene having improved impact strengths. According to the teachings of U.S. Pat. No. 3,388,186, compositions comprising crystalline nylon 6 modified with ethylene copolymers having a minor amount of acrylic or methacrylic acid or an ester derivative and grafted polycaproamide side chains are improved in impact resistance, as are similar compositions with ethylene-acrylic or ethylene-methacrylic copolymers, according to U.S. Pat. No. 3,472,916.

While the art thus discloses the blending of polyamides with a variety of polyolefins and modified polyolefins to obtain improvement in selected properties, combining filled, high-temperature, crystalline polyphthalamides with selected polyolefins or modified polyolefins to achieve improved thermal processability does not appear to have been suggested or recognized in the art.

Polyphthalamide resin formulations with improved thermal processability and moldability, particularly when filled, are continually sought by the art for use in the production of molded and extruded goods. Compositions that are able to accommodate high levels of fiber reinforcement without a concomitant loss of processability could find wide acceptance in the plastics art, and such compositions would be particularly attractive for use in demanding environments where elevated temperatures and corrosive conditions may be encountered.

SUMMARY OF THE INVENTION

The present invention is directed to a filled polyphthalamide composition or resin formulation comprising a polyphthalamide, preferably crystalline or crystallizable, and filler, together with a crystalline polypropylene and a compatibilizing quantity of a carboxylated polypropylene to improve processability. The filled compositions have excellent strength and stiffness properties and good surface appearance and are surprisingly thermally processable. The substantial improvement in processability realized for these resin formulations provides moldable and extrudable resin formulations having extraordinarily high levels of filler, and the compositions provide molded and extruded articles, laminates and composites particularly desirable for use in demanding environments.

DETAILED DESCRIPTION

The improved compositions of this invention are filled blends comprising a polyphthalamide, a crystalline polypropylene, a carboxylated polypropylene and a reinforcing filler.

The polyphthalamides useful in the practice of this invention are copolyamides, and will comprise terephthalamides of aliphatic diamines and at least one additional diamide of an aliphatic diamine as the units forming the copolyamide. The aliphatic diamine component of the units forming the copolyamide may be one or more acylic or cycloaliphatic $C_2$-$C_{12}$ aliphatic diamines such as hexamethylene diamine or the like, including such diamines having one or more $C_1$-$C_4$ alkyl substituents attached to the hydrocarbon portion thereof. The diamide component forming the units of additional diamide will be selected from aromatic diamides such as an isophthalamide, a naphthalene dicarboxylic acid diamide or the like, and $C_4$-$C_{12}$ acyclic or cycloaliphatic carboxlic diamides such as adipamide, sebacamide, cyclohexane dicarboxylic acid diamide or the like. Although the molecular weight of the polyphthalamides is not particularly important, generally molding or extrusion grade resins will be best suited for the purposes of this invention. Such resins are further described as inherent viscosities greater than about 0.4, preferably greater than about 0.6, and more preferably greater than about 0.8 when measured at 30° C. in a 60/40 phenol/tetrachloroethylene (TCE) mixture at a concentration of 0.4 g/dl. Although there is no particular upper limit for molecular weight to be suitable for use in these compositions, very high molecular weight polyphthalamides, those with an inherent viscosity as great as 2.0 or even greater, may be extremely difficult to process thermally and hence will not be preferred.

Although both amorphous and crystalline polyphthalamides are useful in the practice of the invention, the copolyphthalamides described in the art as crystalline or crystallizable will be more useful in extreme environments, and thus will be preferred for most applications. Those polyphthalamides found particularly useful in the practice of the invention comprise hexamethylene terephthalamide units and, more preferably, will comprise hexamethylene terephthalamide units and hexamethylene adipamide units, optionally including hexamethylene isophthalamide units. The crystalline or crystallizable copolyphthalamides will generally comprise at least 50 mole %; more preferably from about 60 mole % to about 90 mole % hexamethylene terephthalamide units with the balance, from about 10 to about 50 mole %; more preferably from about 10 to about 40 mole %, being hexamethylene adipamide units or a mixture thereof with hexamethylene isophthalamide units; with the proviso that the polyphthalamide will comprise not more than 30 mole % isophthalamide units. That is, the preferred polyphthalamides will comprise from about 50 to about 90 mole % hexamethylene terephthalamide units, from about 50 to about 10 mole % hexamethylene adipamide units, and from about 0 to about 30 mole % hexamethylene isophthalamide units. Most preferred are crystalline or crystallizable terpolymers comprising greater than about 60 mole % hexamethylene terephthalamide units, from about 40 to about 15 mole % hexamethylene adipamide units, and from about 0 to about 25 mole % hexamethylene isophthalamide units.

Even though less is preferred, copolyphthalamides comprising less than 50 mole % to as little as about 35 mole % hexamethylene terephthalamide units will also be found to be useful, as will those that comprise greater than 30 mole % and up to about 65 mole % isophthalamide units. Though such copolyphthalamides tend to be amorphous and thus exhibit reduced thermal properties, blends according to this invention comprising such copolyphthalamides exhibit attractive processing, strength and rigidity characteristics and may thus be desired for use in many applications where upper use temperatures are less important. Particularly attractive are the copolyphthalamides comprising from about 40 to about 90 mole % hexamethylene terephthalamide units and, correspondingly, from about 60 to about 10 mole % hexamethylene isophthalamide units, alone or in combination with other units such as hexamethylene adipamide, dodecylene isophthalamide units or the like.

Polyphthalamides are well known in the art, and a variety of copolyphthalamides including those described herein as preferred are available from commercial sources. The polyphthalamide resins and methods for their preparation are also fully described in the art, for example, in U.S. Pat. Nos. 4,603,166 and 4,831,108 the teachings of which are hereby incorporated herein.

The polypropylenes useful in the practice of this invention include both propylene homopolymers and copolymers of propylene comprising minor amounts of one or more copolymerizable alpha olefins such as ethylene, butene-1, pentene-1 and the like. Methods for the production of such polymers are widely known in the art, and suitable polypropylenes are readily available commercially for use as molding and extrusion resins. The preferred polypropylenes are molding and extrusion grade resins having weight average molecular weights typically greater than about 100,000, and are those identified in the art as substantially crystalline homopolymers.

The blends according to this invention will comprise polyphthalamide and polypropylene in weight ratios of from about 20/1 to 1/20. Described in terms of the polyphthalamide component, the invented blends will comprise 100 parts by weight (pbw) polyphthalamide and up to about 200 pbw, preferably from about 5 to about 100 pbw polypropylene.

Blends of highly polar resins such as polyamides with polyolefins are not generally compatible and the art has developed a variety of compatibilizing additives to overcome this deficiency. Among the variety of compatibilizing additives known for such use are carboxyl-modified polyolefins obtained, for example, by grafting polypropylene with a suitable carboxylic compound such as a carboxylic acid, for example acrylic or methacrylic acid, a carboxylic acid anhydride such as maleic acid, an acid amide such as acrylamide or the like in the presence of a peroxide compound. A variety of processes have been developed for the preparation of such additives including, for example, melt-mixing a mixture of polypropylene and the reactants in a compounding extruder. A variety of such processes have been described in the art, for example, in U.S. Pat. No. 5,001,197 and the references discussed therein. The additives may comprise as little as 0.01 wt % carboxyl functionality, more preferably from about 0.1 to as great as 5 wt % or greater carboxyl functionality. The molecular weight of the polymeric additive, which will depend in part on the molecular weight of the polyolefin used in its preparation, is not particularly critical; according to published information, the additives preferred for use with polyamides are those having a melt index in the range of about 0.5 to about 200 g/10 min. Suitable additives are well known and widely available to the trade from commercial sources, including the maleated polypropylenes supplied as Hercoprime G from Himont Corporation and the Exxelor PO series of additives from Exxon Chemical Company, as well as the acrylic acid-grafted polypropylenes and maleated polypropylenes sold under the Polybond label by BP Polymers, Inc. The amount of carboxyl-modified polyolefin additive employed will be a quantity sufficient to compatibilize the polypropylene and polyphthalamide components. Generally, from about 2 to about 20 parts by weight (pbw) carboxyl-modified polyolefin additive, preferably carboxyl-modified polypropylene additive, per 100 parts combined weight of polypropylene and polyphthalamide will suffice to overcome the deficiencies of the blend components and provide the improved compositions of this invention.

The polyphthalamide compositions of this invention further comprise a filler such as a reinforcing filler or structural fiber. Structural fiber useful in forming filled articles and composite products may include glass fiber, carbon or graphite fibers and fibers formed of silicon carbide, alumina, titania, boron and the like, as well as fibers formed from high temperature engineering resins such as, for example, poly(benzothiazole), poly(benzimidazole), polyarylates, poly(benzoxazole), aromatic polyamides, polyaryl ethers and the like, and may include mixtures comprising two or more such fibers. Preferably, the fibers will be selected from glass fibers, carbon fibers and aromatic polyamide fibers such as the fibers sold by the DuPont Company under the trade name Kevlar. The resin blend may be filled with structural fiber in the form of chopped or short fibers, flock, fiber pulp, fibrils and the like to provide molding compositions. Alternatively, the resin blend may be reinforced with fiber in the form of continuous tows of typically from 500 to 420,000 filaments, as continuous unidirectional tape or as woven cloth for providing laminates and structural composites. For most applications, and particularly for use in fiber-filled molding resins, the preferred fiber will be glass fiber, more preferably chopped glass fiber, and will be from about 2 to 50 microns, preferably from about 2 to about 20 microns, and more preferably less than about 10 microns in diameter and generally will be less than about ¼ inch in length.

Other fillers which may also be used in the filled polyphthalamide molding and extrusion resins according to the invention, are the commonly employed flake, spherical and fibrous particulate filler reinforcements and nucleating agents such as talc, mica, titanium dioxide, potassium titanate, silica, kaolin, chalk, alumina, mineral fillers and the like. The fillers and structural fiber may be used alone or in any combination. To provide composite products, the polyphthalamide blends of this invention will comprise from about 10 to about 80 wt % structural fiber, while filled molding resins will comprise from about 10 to about 60 wt %, more preferably from about 20 to about 45 wt % particulate filler or structural fiber or a mixture thereof. The preferred fillers will be talc and structural fiber, preferably glass fiber.

The filled polyphthalamides according to the invention have an outstanding balance of mechanical properties together with improved processability. Aromatic polyamides are high melt-temperature thermoplastics and particularly, when filled, require elevated temperatures and pressures for successful thermal processing such as by extrusion or injection molding. The use of lubricants and processing aids to improve processability often will plasticize the resin, detrimentally affecting mechanical properties, particularly the rigidity. Filled blends according to this invention comprising up to about 200 pbw polypropylene per hundred pbw polyphthalamide, preferably from about 5 pbw polypropylene to about 100 pbw polypropylene per hundred pbw polyphthalamide, are substantially improved in processability over the polyphthalamide alone yet retain a usefully high level of mechanical properties, particularly when fiber reinforced. This surprising and unexpected improvement in processability for fiber-reinforced blends permits the use of higher levels of fiber reinforcement in formulations for molding and extrusion, providing still further enhanced rigidity for filled articles and composites.

The thermal processability of the filled blends of this invention is thus surprising and unexpected, and will be of particular importance to the commercial utility of these blends. The invention may thus also be described as further directed to a method for improving the processability of polyphthalamides.

The filled polyphthalamide blends of this invention may also be combined with pigments, dyes, fillers and the like as is commonly practiced in the resin arts, and these further additives may be employed alone or in any combination as needed. For particular applications, it may also be useful to include plasticizers, lubricants and mold release agents, as well as thermal, oxidative and light stabilizers and the like. The levels of such additives will be determined for the particular use envisioned, with up to about 50 wt %, based on total composition, of such additional additives considered to be within the range of ordinary practice in the molding and extrusion arts.

The invention will be better understood by consideration of the following Examples, which are provided by way of illustration of the invention and are not intended to be limiting thereof. In the Examples, all parts are by weight, and all temperatures are given in Centigrade unless otherwise noted.

EXAMPLES

The following materials and formulations are employed in the Examples.

Polyphthalamide I: Hexamethylene terephthalamide-adipamide-isophthalamide terpolymer, mole ratio 65/10/25, inherent viscosity of 0.94 dl/g determined at 30° C. in a 60/40 phenol/TCE mixture at a concentration of 0.4 g/dl. Obtained as Amodel® polyphthalamide from Amoco Chemical Company.

Polypropylene I: Crystalline polypropylene obtained from Amoco Chemical Company as Amoco 5013. The polymer has an ASTM D 1238 MFR value of 3.7 g/10 min and an IV of 2.05 (decalin, 135° C.), and contains stabilizers.

Polypropylene II: Polypropylene obtained from Amoco Chemical Company as Amoco Enhanced Polypropylene Grade 9433X. The polymer is a nucleated polypropylene with an ASTM D1238 MFR value of 12 g/10 min and a density of 0.91 g/cc, and contains stabilizers.

Polypropylene III: Polypropylene obtained from Amoco Chemical Company as Amoco Enhanced Polypropylene Grade 9119X. The polymer is non-nucleated polypropylene with an ASTM D1238 MFR value of 2 g/10 min and a density of 0.91 g/cc, and contains stabilizers.

Carboxylated Polypropylenes

CarboxyPP A: Carboxylated polypropylene having 3.5 wt % carboxyl functionality, obtained as Hercoprime G from Himont Corporation.

CarboxyPP B: Maleated propylene polymer having 0.4 wt % carboxyl functionality (published value), obtained as Exxelor PO 1015 from Exxon Chemical Company.

CarboxyPP C: Anhydride-grafted polypropylene having 0.1-0.2 wt % carboxyl functionality, obtained as Exxelor PO 2011 from Exxon Chemical Company.

CarboxyPP D: Anhydride-grafted polypropylene having 0.1-0.2 wt % carboxyl functionality, obtained as Exxelor PO 2021 from Exxon Chemical Company.

Glass Fiber S: Chopped glass fiber, nominal dimensions 9.0 micron diameter and 0.1-0.2 in. length, obtained from Owens-Corning Company as OCF-492.

Glass Fiber L: Chopped glass fiber, nominal dimensions 13.0 micron diameter and 0.1-0.2 in. length, obtained from Owens-Corning Company as OCF-457.

TEST PROCEDURES

Mechanical Properties. The mechanical properties are room temperature properties, determined according to ASTM published procedures D638 (tensile properties), D-790-58T (flexural properties) and D-256-56 (notched Izod impact) unless otherwise noted. The heat deflection properties were determined on unannealed samples by ASTM D648.

The methods of the following Examples are representative of those that may be employed for preparing the resin formulation and glass fiber-filled molded articles according to the practice of this invention. The processes will be generally recognized by those skilled in the art as processes and methods commonly employed for the production of fiber-filled resin formulations and molded articles and composites. The specimens of commercial resins used as controls were prepared and tested using substantially the same processes and conditions employed for the examples according to the invention. The test results may vary from published data for commercial materials processed in different equipment under other processing conditions.

EXAMPLES 1-6

Polymer blends comprising up to about equal weights of polypropylene and polyphthalamide were prepared by extrusion compounding polypropylene, polyphthalamide and carboxylated polypropylene. The dried polymer components were first mixed in a tumble mixer, together with stabilizers when employed, then fed to the first feed port of a ZSK-30 Werner Pfleiderer extruder using a nitrogen-purged hopper feeder at a rate of approximately 14 lb/hr. The melt temperatures during the extrusion ranged generally from 285° to about 320° C., depending in part on the ratio of polyphthalamide to polypropylene. The extrudate, after cooling in a water bath, was chopped and then vacuum dried before being injection molded using an Arburg 221E/150 molding machine to form the injection molded test specimens. Control Examples A-D, omitting one or more components, were prepared, molded and tested by the same procedures. The formulations for Examples 1 and 2 include 0.5 wt % talc. Example 3 was compounded using a ⅜ inch, single-screw Brabender extruder. The compositions and properties are summarized in Table I.

TABLE I

| Neat Resin Blends Comprising Polyphthalamide, Propylene and Carboxylated Polypropylene | | | | | | | | | | |
|---|---|---|---|---|---|---|---|---|---|---|
| Example No.: | Control A | 1 | 2 | 3 | Control B | Control C | 4 | 5 | 6 | Control D |
| Blend Components[1] | | | | | | | | | | |
| Polyphthalamide I parts | 100 | 100 | 100 | 100 | 100 | 100 | 100 | 100 | 100 | 100 |
| Polypropylene I parts | — | 13.75 | 31 | 140 | — | 100 | 80 | 90 | 96 | 11 |
| CarboxyPP A parts | — | 11 | 11 | 10 | 11 | — | — | — | — | — |
| CarboxyPP C parts | — | — | — | — | — | — | 20 | 10 | 4 | — |
| Mechanical Properties[2] | | | | | | | | | | |
| Ult. tensile Str. psi | 13,200 | 11,300 | 11,000 | 5,800 | 14,400 | 6,900 | 5,100 | 7,100 | 8,300 | 11,300 |
| Elong./break % | 4.6 | 12.6 | 7.0 | 6.1 | 8 | 4.3 | 6.2 | 10.2 | 7.2 | 4.5 |
| Flex. Mod. Kpsi | — | 400 | 380 | 322 | 460 | — | — | — | — | — |

TABLE I-continued

| | Neat Resin Blends Comprising Polyphthalamide, Propylene and Carboxylated Polypropylene | | | | | | | | | |
|---|---|---|---|---|---|---|---|---|---|---|
| Example No.: | Control A | 1 | 2 | 3 | Control B | Control C | 4 | 5 | 6 | Control D |
| HDT, 264 psi °F. | 240 | 245 | 235 | 193 | 250 | 218 | 193 | 225 | 233 | 235 |

Notes:
[1]For blend preparation, identity of components, see Specification, Examples. Quantities are in parts by weight.
[2]Room temperature properties, see text. Ult. Tensile Str. = ultimate tensile strength; Elong./break = tensile elongation at break; Flex. Mod. = flexural modulus, HDT = heat deflection temperature for 10 mil deflection under 264 psi load.

It will be seen that for the neat resin blends, the addition of polypropylene to polyphthalamide effects a lowering in HDT but sharply reduces strength properties; compare Control A and Control C. The addition of carboxylated polypropylene alone to polyphthalamide increases both strength properties and HDT. The combination of polypropylene and a compatibilizing quantity of carboxylated polypropylene added to polyphthalamide reduces HDT, see Examples 1-6. Strength properties, particularly rigidity, are less affected when only moderate amounts of propylene and modifier, i.e. up to about 100 pbw combined propylene and modifier per hundered parts polyphthalamide, are used; compare Examples 1 and 2 with Example 3. As will be seen from Examples 4-6, the proportion of carboxylated polyolefin additive in the combination of propylene and modifier also affects mechanical properties; at low levels of the carboxylated polyolefin additive the strength properties of polyphthalamides are substantially less affected.

EXAMPLES 7-12

Glass reinforced polymer blends were prepared by extrusion compounding polypropylene, polyphthalamide, glass fiber and carboxylated polypropylene. The dried polymer components were first mixed in a tumble mixer, together with stabilizers when employed, then fed to the first feed port of a ZSK-30 Werner Pfleiderer extruder using a nitrogen-purged hopper feeder at a rate of approximately 14 lb/hr. The glass fiber, also dried, was added to the melt downstream through a side feeder, at the rate necessary to achieve the desired fiber loading, in most instances 7 lb/hr. The melt temperatures during the extrusion ranged generally from 285° to about 320° C., depending in part on the polyamide employed and the ratio of polyamide to polypropylene. The extrudate, after cooling in a water bath, was chopped and then vacuum dried before being injection molded using an Arburg 221E/150 molding machine to form test specimens. Control Example E was similarly prepared and tested. The compositions and properties of the molded, fiber-filled articles are summarized in Table II. The glass fiber levels are the nominal levels; actual values are ±3 wt %.

TABLE II

Polyphthalamide 33 Wt % Glass Fiber-Filled Composites, Modified with Polypropylene and Carboxylated Polypropylene

| Example No.: | 7 | 8 | 9 | 10 | 11 | 12 | Control E |
|---|---|---|---|---|---|---|---|
| Blend Components[1] | | | | | | | |
| Polyphthalamide I, parts | 100 | 100 | 100 | 100 | 100 | 100 | 100 |
| Polypropylene I, parts | 90 | 58 | 36 | 27 | 27 | 19 | 0 |
| CarboxyPP B, pphr | — | — | — | — | 5.3 | — | 0 |
| CarboxyPP C, pphr | 5.3 | 5.3 | 5.3 | 5.3 | — | 5.3 | 0 |
| Glass Fiber S, wt % | 33 | 33 | 33 | 33 | 33 | 33 | 33 |
| Mechanical Properties[2] | | | | | | | |
| Ult. tensile Str., psi | 13,200 | 15,400 | 20,300 | 26,000 | 29,700 | 24,700 | 26,400 |
| Flex. Strength, psi | 20,100 | 22,500 | 29,000 | 35,500 | 40,100 | 32,800 | 33,900 |
| Flex. Mod., Kpsi | 1,100 | 1,080 | 1,480 | 1,280 | 1,400 | 1,330 | 1,430 |
| Izod Impact, ft lb/in-notch | 1.4 | 1.4 | 1.9 | 1.7 | 2.5 | 1.5 | — |
| HDT, 264 psi, °F. | 325 | 322 | 467 | 516 | 540 | 503 | 523 |

Notes:
[1]Resin amounts in parts by weight; CarboxyPP additives in parts by weight per hundred parts combined polypropylene and polyphthalamide resin components (pphr); glass fiber content is 33 ± 3 wt %, based on total weight of reinforced composite; see text, Examples for further description.
[2]Ult. Tensile Str. = ultimate tensile strength; Flex. Strength = flexural strength; Flex. Mod. = flexural modulus; Izod Impact for ⅛ inch thick specimen, notched; HDT = heat deflection temperature for 10 mil deflection under 264 psi load.

It will be apparent that when glass fiber-filled, the strength properties and the rigidity of polyphthalamides are considerably increased. See Control E. The mechanical properties of the glass-filled compositions are retained, even improved, when moderate levels of polypropylene and carboxylated polyolefin compatibilizer are added to the glass-filled resin. See Examples 9-12. At higher levels of the polyolefins, greater than about 40 pbw up to about 100 pbw per hundred parts polyphthalamide, the HDT and strength properties are significantly reduced. See Examples 7 and 8.

As with most high-temperature thermoplastics, thermal processing of filled aromatic polyphthalamides is generally more difficult, requiring equipment capable of obtaining high melt temperatures and the use of heated molds for injection molding. In order to improve the processability of such resins and filled composites, the art has often resorted to the addition of a variety of processing aids, including low molecular weight compounds intended to act as lubricants and to reduce melt viscosity. However, most low molecular weight compounds act as plasticizers, substantially affecting important mechanical properties of the composites such as rigidity and dimensional stability, particularly at high temperatures. The filled polyphthalamides of this invention are substantially improved in processability without resort to such processing aids.

EXAMPLES 13–15

Polyphthalamide-Polypropylene-Carboxylated Polypropylene blends filled with 40–55 wt % glass fiber were compounded on a Berstorff ZE-25 twin screw extruder substantially by the procedures of Example 7, as was the 45 wt % glass fiber-filled polyphthalamide of Control Example F. Molded and tested as before, the resulting composites exhibited the properties summarized in Table III. A control composition comprising polyphthalamide and 55 wt % glass fiber could not be molded to give usable test specimens. The glass fiber levels shown for the Examples are the nominal levels; actual values are ±3 wt %.

TABLE III

Polyphthalamide 40–55 Wt % Glass Fiber-Filled Composites Modified With Polypropylene and Carboxylated Polypropylene

| Example No.: | 13 | 14 | 15 | Control F |
|---|---|---|---|---|
| Blend Components[1] | | | | |
| Polyphthalamide I parts | 100 | 100 | 100 | 100 |
| Polypropylene I parts | 27 | 20 | 20 | 0 |
| CarboxyPP B pphr | 5.3 | 11 | 11 | 0 |
| Glass Fiber S wt % | 40 | 44 | 55 | 45 |
| Mechanical Properties[2] | | | | |
| Tensile Str. psi | 28,000 | 31,100 | 30,000 | 36,500 |
| Wet Tensile Str. psi | 26,300 | 28,300 | — | 35,300 |
| $H_2O$ gain wt % | 0.95 | 0.85 | — | 1.15 |
| Flex. Strength psi | 37,700 | 42,700 | — | 51,100 |
| Flex. Mod. Kpsi | 1,560 | 1,750 | 2,300 | 2,160 |
| Izod. Impact. ft lb/in-notch | 2.6 | 2.6 | 2.5 | 2.7 |
| HDT, 264 psi °F. | 514 | — | 538 | 538 |
| Melt visc., 325° C., 1000/sec shear | 1781 | 1741 | * | 3464 |

Note:
Tensile strengths are ultimate tensile strengths; Wet Tensile strength specimen conditioned at 50% relative humidity; $H_2O$ is wt % moisture absorbed. Also see notes to Table II. *molded without difficulty using generally the molding conditions as in Examples 13 and 14. A Control blend comprising polyphthalamide and 55 wt % glass fiber could not be injection molded.

It will be apparent from these data that the addition of polypropylene to glass-filled polyphthalamides substantially reduces the melt viscosity of the polyphthalamide. The filled polyphthalamide of Control F had a substantially greater melt viscosity value, and was very difficult to injection mold, while the filled blends of Examples 13–15 provided molded articles having excellent surface appearance. The improvement in processability realized for the filled compositions of this invention permits use of substantially greater levels of filler, and provides composites with desirably higher rigidity without loss in processability, thereby extending the range of temperatures and environments where these composites may be employed.

EXAMPLES 16–19

The mechanical properties of glass-filled blends are affected in part by the character of the glass fiber. Glass-filled compositions of Examples 16 and 17, with Glass Fiber L chopped glass fiber recommended for polyolefins, and glass-filled compositions of Examples 18 and 19 comprising Glass Fiber S recommended for use with polyamides, were prepared substantially by the processes of Example 7 and tested. The compositions and properties are summarized in Table IV. The glass fiber levels are the nominal levels; actual values are ±3 wt %.

TABLE IV

Polyphthalamides modified with Polypropylene and Carboxylated Polypropylene; 33 Wt % Glass Fiber-Filled Composites

| Example No.: | 16 | 17 | 18 | 19 |
|---|---|---|---|---|
| Blend Components[1] | | | | |
| Polyphthalamide I parts | 100 | 100 | 100 | 100 |
| Polypropylene I parts | 280 | 28 | 280 | 28 |
| CarboxyPP A pphr | 4.2 | 4.2 | 4.2 | 4.2 |
| Glass Fiber L wt % | 33 | 33 | — | — |
| Glass Fiber S wt % | — | — | 33 | 33 |
| Mechanical Properties[2] | | | | |
| Ult. tensile Str. psi | 14,300 | 17,000 | 18,600 | 24,300 |
| Flex. Strength psi | 19,900 | 22,900 | 25,200 | 32,600 |
| Flex. Mod. Kpsi | 1,080 | 1,390 | 1,100 | 1,240 |
| Izod Impact ft lb/in-notch | 1.7 | 1.2 | 2.1 | 1.9 |
| HDT, 264 psi °F. | 312 | 442 | 316 | 493 |

Note:
See notes to Tables I and II.

By comparing the flexural and tensile strength properties for composites filled with Glass Fiber L (Examples 16 and 17) with data for composites reinforced with Glass Fiber S (Examples 18 and 19) it will be apparent that fiber type has a significant effect on mechanical properties. The particular fiber selected will thus depend in part on the particular use envisioned, and the selection will be made according to the ordinary practice of the molding and extrusion arts.

EXAMPLES 20–25

The procedures of Example 7 were used to extrusion compound, mold and test glass-filled polymer blends from three commercial polypropylenes and Polyphthalamide I at two different levels of the polyphthalamide. The blends also comprised 11 parts by weight CarboxyPP B per hundred parts combined polypropylene and polyphthalamide and 33 wt % Glass Fiber S. The compositions and properties are summarized in Table V. The 33 wt % glass fiber levels are the nominal levels; actual values are ±3 wt %.

TABLE V

Polyphthalamide Composites Modified With Polypropylene and Carboxylated Polypropylene: 33 Wt % Glass Fiber-Filled

| Example No.: | 20 | 21 | 22 | 23 | 24 | 25 |
|---|---|---|---|---|---|---|
| Blend Components[1] | | | | | | |
| Polyphthalamide I, parts | 100 | 100 | 100 | 100 | 100 | 100 |
| Polypropylene I, parts | 280 | 28 | — | — | — | — |
| Polypropylene II, parts | — | — | 280 | 28 | — | — |
| Polypropylene III, parts | — | — | — | — | 280 | 28 |
| CarboxyPP B, pphr | 11 | 11 | 11 | 11 | 11 | 11 |
| Mechanical Properties[2] | | | | | | |
| Ult. tensile Str., psi | 16,000 | 29,700 | 17,400 | 30,700 | 19,400 | 29,200 |
| Flex. Strength, psi | 21,600 | 40,100 | 24,600 | 40,900 | 28,000 | 39,000 |
| Flex. Mod., Kpsi | 1,100 | 1,400 | 1,210 | 1,590 | 1,250 | 1,400 |
| Max. Strain, % | 2.4 | 3.3 | 2.7 | 3.0 | 2.9 | 3.2 |
| Izod Impact, ft lb/in-notch | 2.0 | 2.5 | 2.2 | 2.3 | 2.8 | 2.4 |

TABLE V-continued

Polyphthalamide Composites Modified With Polypropylene and Carboxylated Polypropylene: 33 Wt % Glass Fiber-Filled

| Example No.: | 20 | 21 | 22 | 23 | 24 | 25 |
|---|---|---|---|---|---|---|
| HDT, 264 psi °F. | 308 | 540 | 311 | 544 | 314 | 541 |

Note:
CarboxyPP B in parts per hundred parts by weight combined polypropylene and polyphthalamide.
Also see notes to Table I and II.

In the following Examples 26–32, blends of polypropylene with additional polyphthalamides were prepared and tested.

EXAMPLE 26

Hexamethylene terephthalamide-adipamide-isophthalamide copolyamide having a 65/10/25 mole ratio and an inherent viscosity of 0.99, was prepared substantially following the procedures of U.S. Pat. No. 4,831,108. The polyphthalamide was combined with polypropylene and glass fiber to provide a blend comprising 20 pbw Polypropylene I, 75 pbw of the polyphthalamide and 5 pbw of CarboxyPP B filled with 30 wt % Glass Fiber S, and then injection molded to provide test specimens, substantially according to Example 10. Tested as before, the values obtained for the mechanical properties included HDT=537° F., ultimate tensile strength=28,100 psi, flexural strength=36,300 psi, flexural modulus=1,230 Kpsi and notched Izod impact=2.0 ft lb/in-notch.

EXAMPLE 27

Hexamethylene terephthalamide-adipamide-isophthalamide copolyamide having a 60/20/20 mole ratio and an inherent viscosity of 0.93, was prepared substantially following the procedures of U.S. Pat. No. 4,831,108. The polyphthalamide was combined with polypropylene and glass fiber to provide a blend comprising 20 pbw Polypropylene I, 75 pbw of the polyphthalamide and 5 pbw of CarboxyPP B filled with 28 wt % Glass Fiber S, and then injection molded to provide test specimens, substantially according to Example 10. Tested as before, the values obtained for the mechanical properties included HDT=511° F., ultimate tensile strength=25,400 psi, flexural strength=34,100 psi, flexural modulus=1,200 Kpsi and notched Izod impact=1.9 ft lb/in-notch.

It will be apparent that the preferred hexamethylene terephthalamide copolymers useful in the practice of the invention include compositions having a wide range of ratios of hexamethylene terephthalamide and adipamide. Such compositions optionally may include isophthalamide moieties over a narrower range of up to about 30 mole %. Less preferred compositions will comprise hexamethylene terephthalamide with isophthalamide moieties, alone or with a third diamide moiety.

EXAMPLE 28

A terephthalamide-isophthalamide (80/20 mole ratio) copolyamide was prepared from hexamethylene diamine and dodecyldiamine (80/20 mole ratio) substantially following the procedures of U.S. Pat. No. 4,831,108. The polyamide had an inherent viscosity of 0.99. The copolyamide was combined with polypropylene and glass fiber to provide a blend comprising 20 pbw Polypropylene I, 75 pbw of the polyphthalamide and 5 pbw of CarboxyPP B filled with 29 wt % Glass Fiber S, and then injection molded to provide test specimens, substantially according to Example 10. Tested as before, the values obtained for the mechanical properties included HDT=520° F., ultimate tensile strength=24,000 psi, flexural strength=31,700 psi, flexural modulus=1,200 Kpsi and notched Izod impact=1.2 ft lb/in-notch.

EXAMPLE 29

A hexamethylene terephthalamide-adipamide (60/40 mole ratio) copolyamide was prepared substantially following the procedures of U.S. Pat. No. 4,831,108. The polyamide had an inherent viscosity of 1.12. The copolyamide was combined with polypropylene and glass fiber to provide a blend comprising 20 pbw Polypropylene I, 75 pbw of the polyphthalamide and 5 pbw of CarboxyPP B filled with 32 wt % Glass Fiber S, and then injection molded to provide test specimens, substantially according to Example 10. Tested as before, the values obtained for the mechanical properties included HDT=>550° F., ultimate tensile strength=24,400 psi, flexural strength=34,900 psi, flexural modulus=1,300 Kpsi and notched Izod impact=2.0 ft lb/in-notch.

EXAMPLE 30

A hexamethylene terephthalamide-isophthalamide copolyamide (65/35 mole ratio) was prepared substantially following the procedures of U.S. Pat. No. 4,831,108. The polyamide had an inherent viscosity of 0.98. The copolyamide was combined with polypropylene and glass fiber to provide a blend comprising 20 pbw Polypropylene I, 75 pbw of the polyphthalamide and 5 pbw of CarboxyPP B filled with 45 wt % Glass Fiber S, and then injection molded to provide test specimens, substantially according to Example 10. Tested as before, the values obtained for the mechanical properties included HDT=549° F., ultimate tensile strength=27,200 psi and notched Izod impact=2.1 ft lb/in-notch.

EXAMPLE 31

A hexamethylene terephthalamide-isophthalamide-1,4-cyclohexane dicarboxamide (60/20/20 mole ratio) copolyamide was prepared substantially according to the procedures of U.S. Pat. No. 4,831,108. The polyamide had an inherent viscosity of 1.05. The copolyamide was combined with polypropylene and glass fiber to provide a blend comprising 20 pbw Polypropylene I, 75 pbw of the polyphthalamide and 5 pbw of CarboxyPP B filled with 31 wt % Glass Fiber S, and then injection molded to provide test specimens, substantially according to Example 10. Tested as before, the values obtained for the mechanical properties included HDT=537° F., ultimate tensile strength=23,100 psi, flexural strength=32,300 psi, flexural modulus=1,200 Kpsi and notched Izod impact=2.0 ft lb/in-notch.

EXAMPLE 32

A hexamethylene terephthalamide-isophthalamide-1,10-docecane dicarboxamide (60/15/25 mole ratio) copolyamide was prepared substantially according to the procedures of U.S. Pat. No. 4,831,108. The polyamide had an inherent viscosity of 0.85. The copolyamide was combined with polypropylene and glass fiber to provide a blend comprising 20 pbw Polypropylene I, 75 pbw of the polyphthalamide and 5 pbw of CarboxyPP B filled with 31 wt % Glass Fiber S, and then injection molded to provide test specimens, substantially according to Example 10. Tested as before, the values obtained for the mechanical properties included HDT=461° F., ultimate tensile strength=28,500 psi, flexural strength=39,400 psi, flexural modulus=1,400 Kpsi and notched Izod impact=2.8 ft lb/in-notch.

Glass-filled composites having flexural moduli greater than 1,000 Kpsi were obtained when similar blends of polypropylene with copolyamides comprising polycaprolactam moieties were prepared and tested, as well as from similar blends with copolyamides comprising 2,6-naphthalene dicarboxamides.

Other factors influencing the properties of the molded blends, and particularly of molded glass fiber-filled blends, include the effectiveness of the carboxylated polyolefin additive selected for compatibilizing the polypropylene and polyphthalamide components.

EXAMPLES 33-35

Three glass fiber-filled blends comprising 100 pbw polyphthalamide I, 33 pbw polypropylene and 5 parts carboxylated polypropylene, filled with 33 wt % Glass Fiber S, were prepared and tested substantially by the processes for Example 7, but using different carboxylated polypropylene additives. The properties are summarized in Table VI. The glass fiber levels are the nominal levels; actual values are ±3 wt %.

TABLE VI

33 Wt % Glass Fiber-Filled Polyphthalamide Composites Modified With Polypropylene and Carboxylated Polypropylene

| Example No.: | 33 | 34 | 35 |
|---|---|---|---|
| Blend Components[1] | | | |
| Polyphthalamide I parts | 100 | 100 | 100 |
| Polypropylene I parts | 33 | 33 | 33 |
| Carboxy PP C pphr | 5 | — | — |
| Carboxy PP D pphr | — | 5 | — |
| Carboxy PP B pphr | — | — | 5 |
| Glass Fiber S wt % | 33 | 33 | 33 |
| Mechanical Properties[2] | | | |
| Ult. tensile Str. psi | 21,300 | 24,600 | 26,000 |
| Flex. Strength psi | 30,700 | 34,400 | 36,000 |

Note:
See Notes to Table I and II.

EXAMPLE 36

A glass fiber-filled blend comprising 100 pbw polyphthalamide I, 33 pbw polypropylene I and 7 parts CarboxyPP A carboxylated polypropylene, filled with 33 wt % Glass Fiber S, was prepared, molded and tested substantially following the procedures for Example 8. The resulting molded blend had an ultimate tensile strength of 20,100 psi and a flexural strength of 28,300 psi.

It will be apparent from Examples 33-35, that the level of carboxylation affects the mechanical properties of glass fiber-filled blends, with the higher level of carboxylation for CarboxyPP C (0.4 wt %) effecting greater improvement for this particular series of additives. Other characteristics of the carboxylated polypropylene such as molecular weight may also affect mechanical properties, as will be apparent from a comparison of Example 36, made with the high carboxyl (3.5 wt %) low molecular weight additive CarboxyPP A. However, even though the degree of improvement varied, all carboxylated polypropylenes evaluated in blends according to the invention provided substantial improvement over corresponding blends without such additives.

Polyphthalamides comprising fillers other than glass fiber also possess desirable properties and may find wide utility. Polyphthalamides filled with particulate fillers such as, for example, talc will also be found improved in processability when compounded with polypropylene and a carboxylated polypropylene.

EXAMPLE 37

A talc-filled blend comprising 100 pbw polyphthalamide I, 27 pbw polypropylene I and 7 parts CarboxyPP B carboxylated polypropylene, together with 30 wt % talc, was prepared, molded and tested substantially following the procedures for Example 8. The talc was obtained from Cyprus Mineral Company as Mistron Superfrost® talc. The molded blend specimens had an ultimate tensile strength of 9,700 psi, elongation at break of 2.2%, a flexural strength of 13,400 psi, a flexural modulus of 795 Kpsi and a 264 psi HDT of 271° F.

The invention will thus be seen to be a filled blend comprising a filler, a polyphthalamide, crystalline polypropylene and a carboxylated polyolefin compatibilizer, and composites molded articles made therefrom. More particularly, the filled blend according to the invention will comprise 100 parts by weight (pbw) polyphthalamide, from about 5 to about 200 pbw polypropylene and from 1 to about 20 pbw, per 100 parts combined weight of polypropylene and polyphthalamide, of carboxyl-modified polyolefin additive, preferably carboxyl-modified polypropylene additive. The polyphthalamide may be further described as a copolyamide comprising terephthalamides of acyclic or cycloaliphatic $C_2$-$C_{12}$ aliphatic diamines with at least one additional diamide selected from aromatic diamides of aliphatic diamines and $C_4$-$C_{12}$ acyclic and cycloaliphatic dicarboxylic anides of aliphatic diamines, and more preferably will be a crystalline or crystallizable polyphthalamide comprising from about 50 to about 90 mole % hexamethylene terephthalamide, from about 50 to about 10 mole % hexamethylene adipamide, and from about 0 to about 30 mole % hexamethylene isophthalamide. When combined with up to about 80 wt %, preferably from about 5 to about 50 wt % particulate filler or structural fiber, either as continous fiber or in the form of chopped or short fibers, flock, fiber pulp, fibrils or the like, the filled blends of this invention are useful in forming laminates and structural composites and filled molded and extruded articles.

The invention may also be characterized as a method for improving the processability of polyphthalamides and particularly filled copolyphthalamides comprising compounding the polyphthalamide with up to 50 wt %, preferably from about 5 to about 25 wt %, more preferably from about 5 to about 15 wt % polypropylene together with from about 2 to about 10 wt % carboxylated polypropylene, based on total resin components. Such improved polyphthalamides remain surprisingly processable even when compounded to include unusually high levels of fiber reinforcement.

The invention has been described and illustrated by way of specific embodiments set forth herein. Although the blends thus described are characterized as comprising a polypropylene and a carboxyl-modified polypropylene, those skilled in the art will recognize that alternative methods of preparation are available, such as by carrying out the polypropylene carboxylation using a very small quantity of carboxylic acid or anhydride or the like to provide a mixture comprising both carboxylated and unmodified polypropylene polymer chains, and such alternative methods and processes will be considered to lie within the scope of the invention. Still further modifications and variations will also be apparent to those skilled in the resin formulating and composite fabricating art, and such variations and modifications will be included within the scope of the invention as defined by the appended claims.

We claim:

1. A filled polyphthalamide comprising at least one filler selected from structural fiber and particulate fillers, and a blend of (a) 100 pbw of a copolyphthalamide comprising from about 50 to about 90 mole % hexamethylene terephthalamide units; (b) from about 5 to about 40 pbw crystalline polypropylene; and (c) from 2 to about 20 pbw, per 100 parts combined weight of polypropylene and polyphthalamide, of carboxyl-modified polypropylene.

2. The filled polyphthalamide of claim 1 comprising from about 10 to about 50 wt %, based on total filled composition, of particulate filler selected from talc and glass fiber.

3. The filled polyphthalamide of claim 1 comprising up to about 80 wt %, based on total filled composition, of a structural fiber.

4. The filled polyphthalamide of claim 1 wherein said copolyphthalamide comprises from about 50 to about 90 mole % hexamethylene terephthalamide units and from 10 to about 50 mole % hexamethylene adipamide units.

5. The blend of claim 1 wherein said copolyphthalamide comprises from about 60 to about 90 mole % hexamethylene terephthalamide units, from 40 to about 15 mole % hexamethylene adipamide units and from 0 to about 25 mole % hexamethylene isophthalamide units.

6. The blend of claim 1 wherein said carboxy-modified polypropylene is selected from the group consisting of maleated polypropylene and acrylic acid-grafted polypropylene.

7. The blend of claim 2 wherein said glass fiber is chopped glass fiber.

8. A method for improving the processability of polyphthalamide resin comprising the step of compounding said resin with from about 5 to about 25 wt % polypropylene and from about 2 to about 10 wt % carboxylated polypropylene, based on total resinous components.

9. The method of claim 8 wherein said polyphthalamide resin comprises from 5 to about 60 wt % glass fiber, based on total of resinous components and glass fiber.

* * * * *